US009118383B2

(12) United States Patent
Arcidiacono et al.

(10) Patent No.: US 9,118,383 B2
(45) Date of Patent: Aug. 25, 2015

(54) TELECOMMUNICATION NETWORK (75) Inventors: Antonio Arcidiacono, Paris (FR);
Daniele Vito Finocchiaro, Paris (FR)

(73) Assignee: EUTELSAT S A, Paris (FR)

( * ) Notice: Subject to any disclaimer, the term of this patent is extended or adjusted under 35 U.S.C. 154(b) by 91 days.

(21) Appl. No.: 13/201,012

(22) PCT Filed: Feb. 5, 2010

(86) PCT No.: PCT/EP2010/051451
§ 371 (c)(1),
(2), (4) Date: Oct. 26, 2011

(87) PCT Pub. No.: WO2010/092011
PCT Pub. Date: Aug. 19, 2010

(65) Prior Publication Data
US 2012/0034915 A1    Feb. 9, 2012

(30) Foreign Application Priority Data
Feb. 11, 2009 (FR) ...................................... 09 50854

(51) Int. Cl.
*H04B 7/185* (2006.01)
(52) U.S. Cl.
CPC .................................. *H04B 7/18513* (2013.01)
(58) Field of Classification Search
CPC ... H04W 84/06; H04W 16/28; H04W 52/241; H04W 52/243; H04B 7/18513
USPC .............. 455/427–431, 418–420, 456.1–457, 455/11.1–13.4
See application file for complete search history.

(56) References Cited

U.S. PATENT DOCUMENTS

| 5,561,836 | A | 10/1996 | Sowles et al. |
| 6,125,260 | A | 9/2000 | Wiedeman et al. |
| 8,634,817 | B2 * | 1/2014 | Kanade .................. 455/418 |
| 2003/0073435 | A1 | 4/2003 | Thompson et al. |
| 2007/0149127 | A1 * | 6/2007 | Karabinis ............... 455/63.1 |
| 2008/0227400 | A1 * | 9/2008 | Wigren .................. 455/67.13 |

FOREIGN PATENT DOCUMENTS

| EP | 0 999 662 A | 5/2000 |
| EP | 1 655 863 A | 5/2006 |

OTHER PUBLICATIONS

International Search Report as issued for International Application No. PCT/EP2010/051451, dated Apr. 26, 2010.

* cited by examiner

*Primary Examiner* — Marcos Torres
(74) *Attorney, Agent, or Firm* — Pillsbury Winthrop Shaw Pittman LLP (57) ABSTRACT

A network for establishing RF links between a main ground station connected to a NOC center and ground terminals via a multispot satellite, the network being composed of a coverage area composed of a plurality of cells in which terminals are located, each cell being associated with at least one link spot beam with the satellite to which a frequency band is allocated, the center including a determination module to determine the transmission parameters characteristic of the position of terminals in the coverage area, the parameters covering the entire coverage area and a transmitter to transmit all parameters to each of the terminals. Each of the terminals includes a storage device to store at least part of all the parameters, a positioning device to determine its geographic position in the coverage area and a processor to determine, from the parameters and its geographic position, the transmission parameters to be utilized.

26 Claims, 3 Drawing Sheets

TELECOMMUNICATION NETWORK

CROSS REFERENCE TO RELATED APPLICATIONS

This application is the U.S. National Stage of PCT/EP2010/051451, filed Feb. 5, 2010, which in turn claims priority to French Patent Application No. 09/50854, filed Feb. 11, 2009, the entire contents of all applications are incorporated herein by reference in their entireties.

The present invention relates to a telecommunication network for establishing radiofrequency links between at least one main ground station connected to a network operating center and ground terminals via a multispot telecommunication satellite. This type of satellite enables the use of several spot beams on board the satellite to cover many geographic areas or cells, instead of a single large spot beam.

Such multispot satellites enable several radiofrequency links occupying the same frequency band on different spot beams to be established.

In the case of a high bandwidth broadband satellite telecommunication system, the satellite is used bidirectionally, which is to:

relay data sent by a main ground station (connected to a Network Operating Center or NOC) to a plurality of ground terminals: this first point to multipoint type link constitutes the forward link;

relay data sent by the ground terminals to the main ground station: this second multipoint to point type link constitutes the return link.

Figure 1:
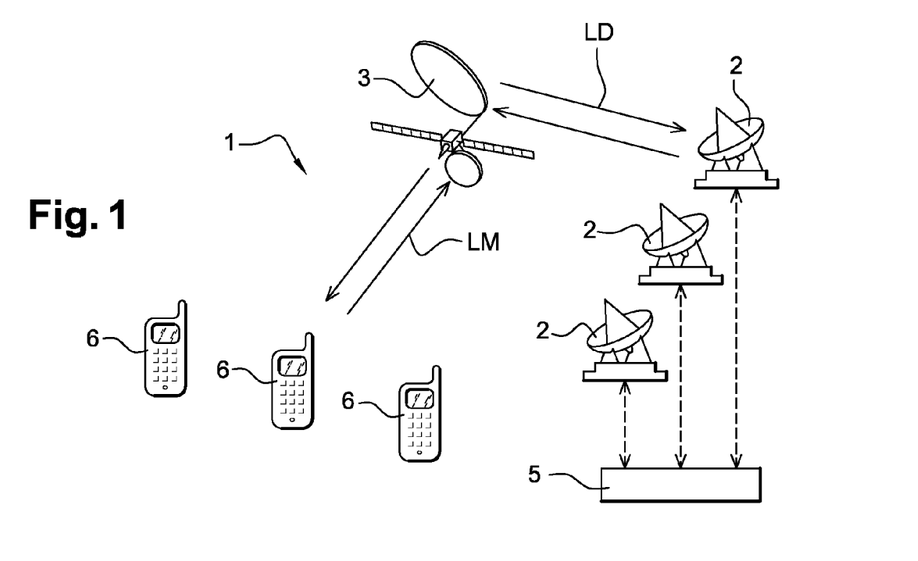
FIG. 1 is a simplified schematic representation of a multispot configuration network.

An example of such a multispot telecommunication network 1 is illustrated in FIG. 1.

This network 1 comprises:
a plurality of main ground stations 2 such as communication gateways;
a NOC center 5;
a plurality of ground terminals 6;
a multispot satellite 3.

The main ground stations 2 (also called central stations below) are connected to the NOC center 5 (typically via the Internet). The NOC center 5 is a network management system that allows the operator to monitor and control all the components in the network.

In return link, the signals are sent to the multispot satellite 3 over an uplink LM by the ground terminals 6. The signals sent by the ground terminals 6 are then processed at the level of the satellite 3 payload that amplifies them, derives the signals at a generally lower frequency and then retransmits the signals from the satellite antenna or antennas on a downlink LD in the form of a plurality of spot beams to ground stations 2.

The forward link from the ground stations 2 to the ground terminals 6 operates identically with an opposite communication direction.

The coverage area in which the ground terminals are located is broken down into basic coverage areas or cells. Each cell is associated with at least one spot beam from the multispot satellite.

Network 1 such as represented in FIG. 1 uses a technique known as the frequency reuse technique: This technique allows the same frequency range to be used several times in the same satellite system in order to increase the total capacity of the system without increasing the allocated bandwidth.

Frequency reuse schemes, known as color schemes (where each color corresponds to a frequency band), assigning one color to each of the satellite spot beams, are known. These color schemes are used to describe the allocation of a plurality of frequency bands to the satellite spot beams in view of radiofrequency transmissions to carry out in each of these spot beams. In these schemes, each color corresponds to one of these frequency bands.

In addition, these multispot satellites enable polarized transmissions to be sent and received: The polarization may be linear (in this case the two directions of polarization are respectively horizontal and vertical) or circular (in this case the two directions of polarization are respectively left circular or right circular).

However, such a configuration is likely to pose several difficulties.

Typically, in the case of a communication uplink between a ground terminal and the multispot satellite, the satellite serves the entire coverage area that includes a plurality of basic cells. Each of the cells is individually illuminated by an antenna spot beam from the multispot antenna on the satellite. A frequency band is associated with each cell and, within each frequency band, many different frequency channels are available for the ground terminals operating in these cells. A ground terminal of a first cell thus operates on a slot or channel from the frequency band associated with said first cell. It will be noted that in the case of the utilization of a transmission coding system based on the spread spectrum of the CDMA (Code Division Multiple Access) type, many terminals from the same cell may use one and the same channel at the same time.

The user terminal also operates in a specific time interval for the channel utilized. The uplink departing the user terminal is directed in the main spot beam of the multispot antenna that serves the cell. This main spot beam also comprises multiple lateral lobes. Consequently, interference of the common channel may also be transmitted by the ground terminal to the lateral lobes of another spot beam serving another cell using the same frequency band. This cross interference phenomenon between cells is explained by the fact that the multispot antenna may not completely control its reception characteristics. The interference signal that arrives at the lateral lobes, even at a power level lower than the power level of the main signal, constitutes interference leading to signal degradation.

A known solution that reduces this cross interference phenomenon between cells is described in patent document EP0999662. According to this document, before transmitting, the user terminal sends a service request to the NOC center. The latter has a user database comprising various parameters. Each time the NOC receives a request from a user terminal, it determines for this user terminal a transmission parameter (typically the frequency slot and the temporal slot over which the terminal will transmit) then it transmits this transmission parameter to the user terminal.

However, such a solution according to the prior art presents two major disadvantages.

First, the process as described in document EP0999662 necessarily implies that the terminal opens a connection with the NOC (via sending a request) to inform it that it wishes to establish communication and to obtain the transmission parameter. Sending this request thus brings about an additional delay, which may prove to be detrimental.

In addition, this process effectively leads to the use of part of the frequency band available for sending requests. This utilization of the band is independent from the type of communication that the terminal seeks to establish. Therefore, particularly for terminals transmitting small-size messages at a high frequency, the process will bring about a high and unacceptable bandwidth capacity occupation. For example, this is the case with POS "Point of Sale" type fixed terminals that transmit short messages with a high transmission frequency or mobile terminals sending text messages (emails or SMS).

In this context, the present invention aims to provide a telecommunication network for establishing radiofrequency links between at least one main ground station connected to an operating center of said network and ground terminals via a multispot telecommunication satellite, said network reducing cross interference while preventing high consumption of the available frequency band and reducing processing delays.

For this purpose, the invention proposes a telecommunication network for establishing radiofrequency links between at least one main ground station connected to an operating center of said network and ground terminals via a multiple spot beam telecommunication satellite, known as a multispot satellite, said network comprising:
- a multispot satellite,
- at least one main ground station,
- a set of ground terminals,
- a coverage area composed of a plurality of cells in which said ground terminals are located, each cell being associated with at least one spot beam with said satellite to which a frequency band is allocated,
- an operating center of said network connected to said main ground station, said network being characterized in that said operating center comprises:
- means for determining, at all times, transmission parameters characteristic of the position of said ground terminals in said coverage area, known as optimization means, said transmission parameters covering the entire said coverage area,
- means for transmitting to each of said ground terminals all transmission parameters determined by said optimization means, each of said ground terminals comprising:
- means for determining its geographic position in said coverage area,
- means for storing at least one part of said set of transmission parameters,
- Means for determining the transmission parameters to be used by said ground terminal from said stored part of said set of transmission parameters and from said geographic position.

Ground terminal is understood to refer to a terminal that may be fixed, transportable or mobile.

Main ground station (gateway) is understood to refer to any central station such as a ground communication gateway connected to the operating center, typically via an Internet backbone.

Operating center is understood to refer to a NOC "Network Operating Center" that constitutes a network management system that allows the operator to monitor and control all network components.

Thanks to the invention, the NOC operating center optimizes the overall performance of the network for the entire coverage area (typically by reducing to the maximum cross interference between the cells of the coverage area). The NOC thus has optimized transmission parameter (i.e., all of the transmission parameters) mapping for the entire coverage area. This mapping particularly comprises a frequency (as well as other parameters) allocation plan to be used by the terminals. The NOC then transmits this mapping to all ground terminals in the network according to the invention, by preferentially using a single "broadcast" transmission (simultaneous transmission to all terminals). The mapping is regularly updated according to variations in the network operating conditions.

Each ground terminal receives this mapping, which is stored in the terminal storage means and updated with every new transmission by the NOC. To minimize the quantity of storage necessary, the terminal may store only the part of the mapping that is necessary to the terminal (typically the part corresponding to its current position and the vicinity of this position).

When the terminal wants to send a message, it starts by locating its position via means utilizing, for example, a GPS system; it executes some software means enabling it to determine, from its position and stored mapping, the transmission parameters (frequency band, frequency channel within this band, polarization, time slot, modulation, code, etc.) to be used to send this message. Contrary to the known networks in prior art, the terminal therefore does not have to send a request to the NOC to obtain its transmission parameters.

The network according to the invention may also present one or more of the characteristics below, considered individually or according to all technically possible combinations:
- said transmission parameters are determined by said optimization means to reduce cross interference between said cells;
- said means for determining the geographic position in said coverage area of the mobile terminals from among said set of ground terminals are chosen from among the following means:
  - means using a satellite positioning system (GPS, EGNOS, Galileo, etc.);
  - positioning means using wireless access points (WIFI, WiMax, etc.);
  - positioning means based on one or more cellular type base stations (GSM, UMTS, etc.);
  - absolute positioning means such as measuring the ground magnetic field or the power received from known radio stations;
  - relative positioning means such as an inertial positioning system;
- said means for determining the geographic position in said coverage area are such that they enable said ground terminal to determine its position with an accuracy of less than one order of magnitude to the size of the cell in which the ground terminal is situated;
- said optimization means periodically determine said transmission parameters;
- the updating period is between 1 and 1440 minutes depending on the speed of network state change;
- periodic updating is performed by taking the state of said network into consideration from data obtained in real time on the position of the terminals in said coverage area;
- at least one cell is associated with at least two link spot beams with said satellite, a frequency band being allocated to each of said two spot beams, such that said optimization means determine the frequency band to use within said cell so as to reduce cross interference between the cells forming the coverage area;
- said optimization means comprise means for determining, at every update, for every coverage area, the frequency channel to be used by the terminals according to their position in said coverage area, each frequency band being broken down into frequency channels;

said optimization means comprise means for determining, at every update, the type of modulation to be used by the terminals depending on their position in said coverage area;

the network according to the invention comprises a plurality of main ground stations, each main ground station being connected to said operating center of said network;

said optimization means determine a group of acceptable transmission parameters for each of the geographic positions;

said means for determining the transmission parameters to be used by said ground terminal select the transmission parameters to be used according to a probability distribution, in the group of acceptable parameters, for said terminal;

said means for determining the transmission parameters to be used by said ground terminal select the transmission parameters to be used according to the particular limitations of said ground terminal, in the group of acceptable parameters for said terminal;

said group is determined from said geographic position of said ground terminal by said means for determining the transmission parameters;

said transmission parameters are determined by said optimization means by taking into consideration such factors as:
  the intermodulation between different frequency bands on board the satellite;
  the measured sensitivity (G/T figure) of the satellite antenna for each coverage;

Said storage means of said ground terminal store all transmission parameters.

Another object of the present invention is a network operating center according to the invention, said operating center comprising:
  means for determining, at all times, transmission parameters characteristic of the position of said ground terminals in said coverage area, known as optimization means, said transmission parameters covering the entire said coverage area,
  means for transmitting to each of said ground terminals all transmission parameters determined by said optimization means.

In addition, the object of the present invention is a ground terminal for implementing a network according to the invention, said terminal comprising:
  means for determining its geographic position in said coverage area,
  means for storing at least one part of said set of transmission parameters,
  means for determining the transmission parameters to be used by said ground terminal from said stored part of said set of transmission parameters and from said geographic position.

Other characteristics and advantages of the invention will clearly emerge from the description given below, for indicative and in no way limiting purposes, with reference to the attached figures, among which.

In all figures, common elements bear the same reference numbers.

FIG. 1 has already been described above with reference to the reminder of the prior art.

Figure 2:
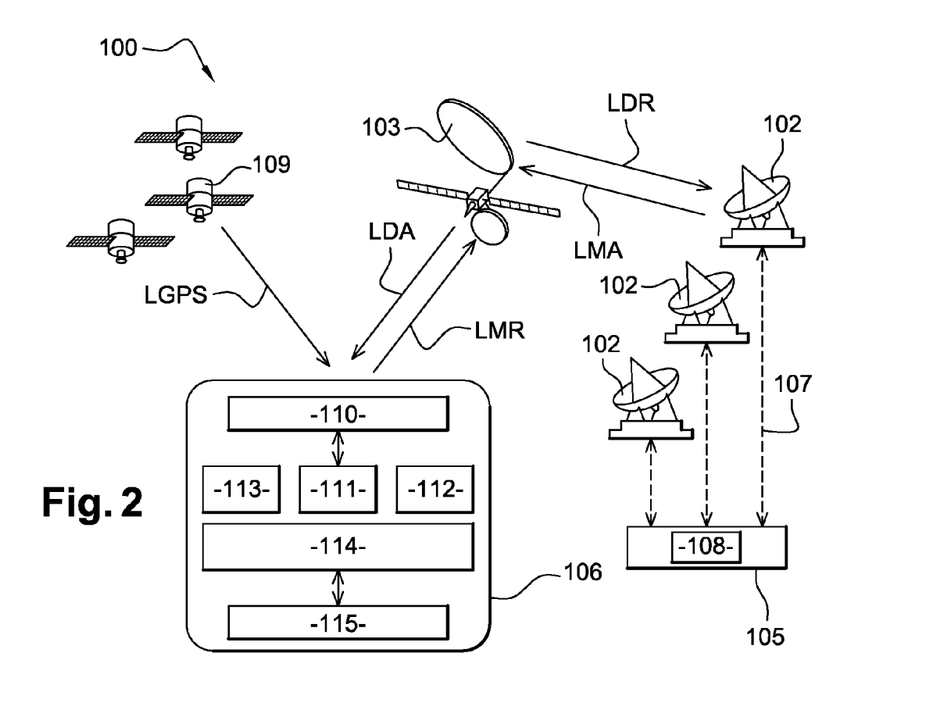
FIG. 2 is a simplified schematic representation of a network according to the invention.

FIG. 2 is a simplified schematic representation of a network 100 according to the invention.

This network 100 comprises:
  a plurality of main ground stations 102 such as ground communication gateways;
  a NOC center 105;
  a plurality of ground terminals 106 that may be mobile terminals but also fixed terminals (as an illustration, a single ground terminal 106 is represented here);
  A multispot satellite 103.

The ground terminal 106 is equipped with:
  an antenna 110,
  a GPS "Global Positioning System" terminal 113, enabling it to know its position via LGPS links with satellites 109 at all times,
  a modem 111 allowing it to transmit and receive data during exchanges with the multispot satellite 103;
  storage means 112 (database);
  management means 114;
  Input/output interface means 115 (keypad, speaker, etc.).

Management means 114 typically comprise a microprocessor controlled by programs situated in a program memory. The program memory is notably intended for the management of different operations to be executed to implement different functionalities of terminal 106. The memory comprises several software means (i.e., applications), some of which are dedicated to implementing the invention. In other examples of embodiment, these software means may be replaced by specific electronic circuits.

The main ground stations 102 (also called central stations) are connected to NOC center 105, typically via an Internet backbone.

In return link, the signals are sent to the multispot satellite 103 over an uplink LMR by the ground terminals 106. The signals sent by the ground terminals 106 are then processed at the level of the satellite 103 that, via its payload, amplifies them, derives the signals at an appropriate frequency, then retransmits the signals from the satellite antenna or antennas on a downlink LDR in the form of a spot beam or a plurality of spot beams to the ground stations 102.

The forward link, including uplinks LMF and downlinks LDF of ground stations 102 to ground terminals 106, operates identically with an opposite communication direction.

The coverage area in which the ground terminals are located is broken down into basic coverage areas or cells.

The configuration of the network 100 according to the invention as represented in FIG. 2 utilizes a technique known as the frequency reuse technique. This technique allows the same frequency range to be used several times in the same satellite system in order to increase the total capacity of the system without increasing the allocated bandwidth.

For each cell, it is possible to use at least one frequency band corresponding to part of the available bandwidth. Each frequency band is associated with a spot beam from the multispot satellite. Each frequency band may be broken down into a plurality of frequency channels. A ground terminal 106 will use a frequency channel to transmit; this same terminal 106 will also operate in a particular time interval (temporal slot).

According to the invention, the NOC center 105 comprises means 108 for determining a mapping of the coverage area with a determination of the transmission parameters characteristic of the position of the ground terminals in the coverage area. These determination means 108 will be subsequently designated by the term "optimization means." The transmission parameters typically include the frequency band, the frequency channel, the temporal slot and the type of modulation or code to be used by the terminals depending on their position in the coverage area. The mapping is comprehensive; in other words, the mapping includes the transmission parameters for the entire coverage area: These transmission parameters are determined by the optimization means 108 so as to reduce the cross interference between cells and to maximize system performance. It will be noted that several sets of parameters may be acceptable for the same location.

Typically an initial mapping (we will return to this point later with reference to FIGS. 4 and 5) is provided to the optimization means 108. The mapping is transmitted to all ground terminals 106 in network 100 and then is stored by each of the ground terminals 106 in its storage means 112.

Henceforth, when a terminal 106 wants to establish a connection, it starts by locating its position via its GPS positioning system 113. Management means 114 of terminal 106 comprise a software application allowing the determination, from its position and stored mapping, of the transmission parameters (frequency band, frequency channel within this band, time slot, modulation, polarization, level, code, FEC, etc.) to be used to establish this connection, by choosing from among the possible parameters defined by the mapping. In case of a plurality of acceptable sets of parameters, the choice, from among the acceptable parameters, may be made depending on the limitations of the terminal, such as the type of terminal or type of message that will be sent, and/or randomly according to an appropriate probability distribution (possibly sent by NOC 105 with the mapping).

According to a particularly advantageous embodiment of the invention, optimization means 108 determine a new mapping based on real-time data collected from main ground stations 102, said data concerning the current position of ground terminals within the network. When the mapping is updated by optimization means 108, the mapping update is transmitted to all ground terminals 106. The updating period is typically between one minute and several hours, depending on how fast the network state is changed. However, in the absence of a mapping update, the old mapping is sent bit by bit to benefit the terminals that were not listening before (terminals that were powered off, or lacking satellite reception).

Optimization means 108 typically utilize combinatorial algorithms so as to determine the best possible mapping for reducing cross interference between cells. In other words, optimization means 108 will determine the mapping that allows the maximum amount of data to be transferred from ground terminals 106 to ground stations 102 via satellite 103 while minimizing the impact of cross interference generated by different cells.

Figure 3:
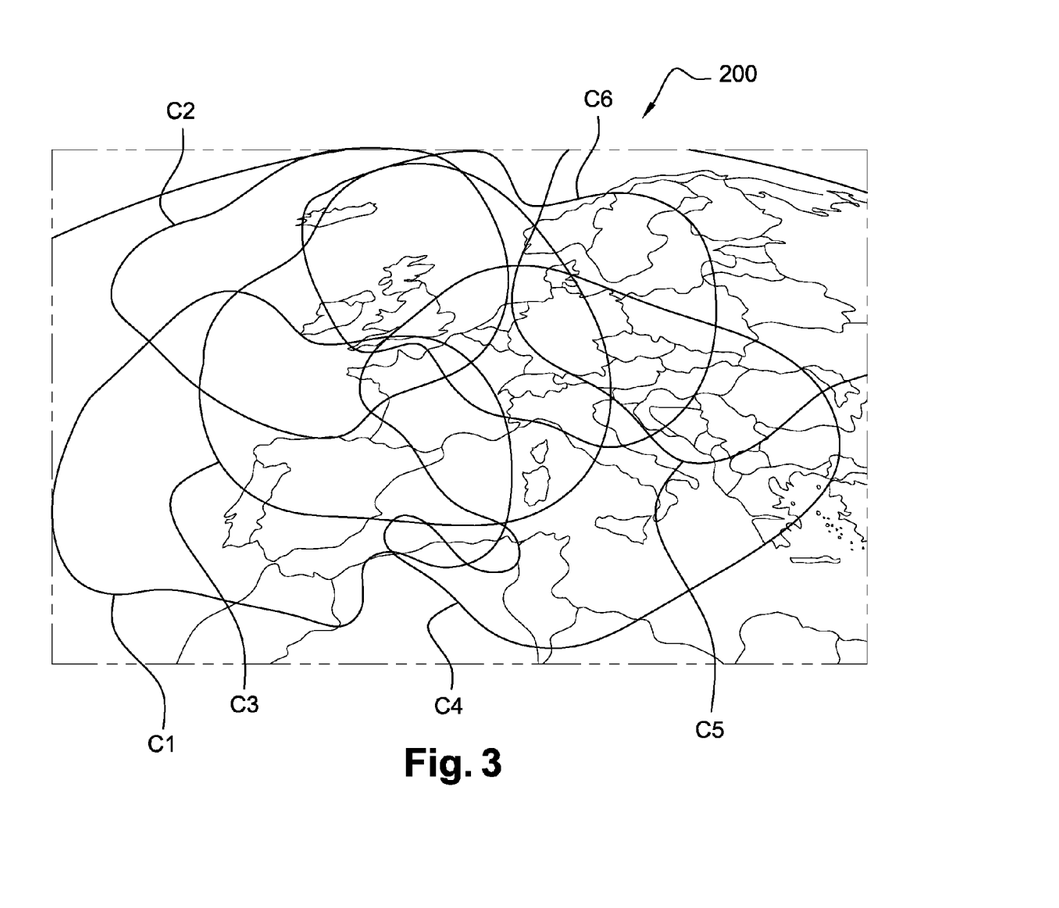
FIG. 3 represents a coverage area composed of a plurality of cells.

An example of a coverage area 200 is illustrated in FIG. 3. This area 200 covers part of Europe and groups together 6 cells C1 to C6 in the case of a multispot configuration of the return link in band S at 2 GHz for satellite Eutelsat W2A. This example is given for purely illustrative and in no way limiting purposes. Satellite W2A has 15 MHz of global frequency band for each direction. Table 1 below mentions the countries associated with the centers of cells (in other words, each of these countries allows a cell to be identified).

TABLE 1

| C1 | C2 | C3 | C4 | C5 | C6 |
|---|---|---|---|---|---|
| Spain (SP) | Great Britain (UK) | France (FR) | Italy (IT) | Poland (PL) | Germany (G) |

It will be noted that the cells present overlapping areas. The terminals of the network according to the invention know their transmission parameters independently of the cell or cells in which they are located; according to a preferential embodiment of the invention, it is important that each terminal may determine its position with an accuracy of less than one order of magnitude to the size of the cell in which the ground terminal is situated (typically an accuracy of around 50 km for a cell of 500 km of diameter).

For each cell, in the case of W2A, it is possible to utilize up to two frequency bands, each having a width of 5 MHz from among the 15 MHz of available band. Each frequency band is associated with a spot beam from the multispot satellite. In the case of an FDMA type protocol, each 5 MHz-frequency band is broken down into a plurality of frequency channels. In the case of a CDMA type protocol, each band represents a single channel that may be utilized at the same time by a limited number of terminals.

In each 5 MHz frequency band, a ground terminal will utilize a channel for transmission.

Figure 4:
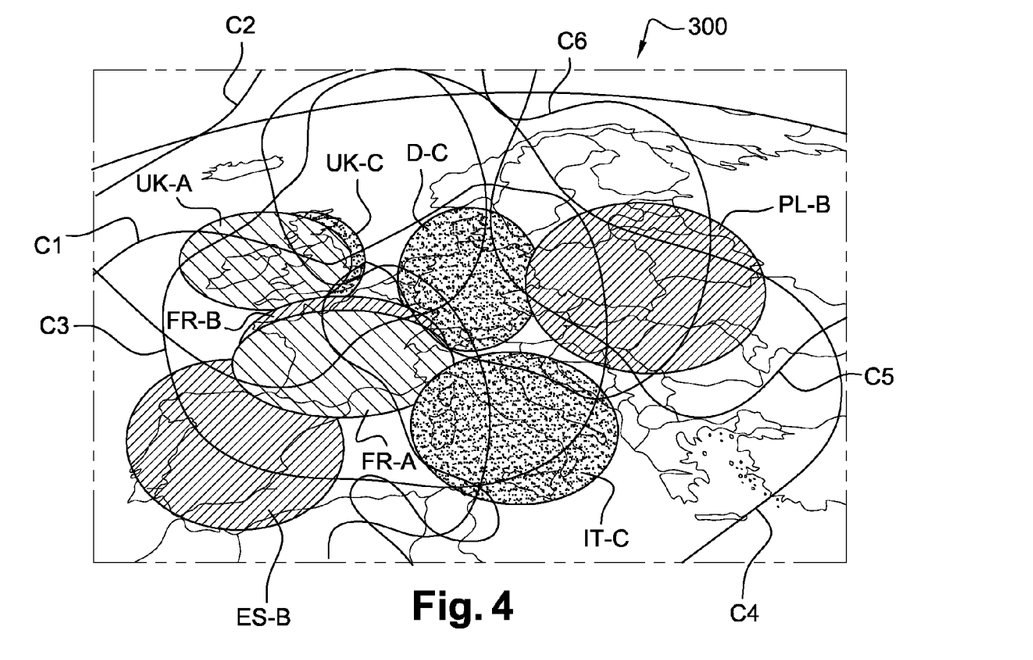
FIG. 4 represents the coverage area of FIG. 3 with a first frequency plan.

FIG. 4 represents the coverage area of FIG. 3 with a first frequency plan 300 that constitutes a frequency plan adapted for being implemented without using a network according to the invention. This first frequency plan 300 obviously takes a certain number of restrictions into consideration. It will be noted that each 5 MHz frequency band is associated with a blue, yellow or red color in a frequency reuse scheme, also called a color scheme:

the color blue is represented by close-together hatched lines and corresponds to frequency band B;

the color red is represented by spaced-apart hatched lines and corresponds to frequency band A;

the color yellow is represented by dots and corresponds to frequency band C.

Without using the invention, one is obligated to allocate frequencies (from among the 12 total bands possible, that is to say, 2 bands for each of the 6 cells) according to a suboptimized plan to avoid interference. Typically in the case of plan 300, only 8 bands are utilized from among the 12 possible bands with a total bit rate of 50 Mbps. This frequency plan 300 is determined a priori from combinatorial algorithms so as to determine the best possible mapping for reducing cross interference between cells. Table 2 indicates the frequencies associated with different countries in the coverage area.

TABLE 2

| Spain (SP) | Great Britain (UK) | France (FR) | Italy (IT) | Poland (PL) | Germany (G) |
|---|---|---|---|---|---|
| B (referenced by | A and C (referenced | A and B (referenced | C (referenced by | B (referenced by | C (referenced by |

TABLE 2-continued

| Spain (SP) | Great Britain (UK) | France (FR) | Italy (IT) | Poland (PL) | Germany (G) |
|---|---|---|---|---|---|
| SP-B) | by UK-A and UK-C) | by FR-A and FR-B) | IT-C) | PL-B) | G-C) |

This limitation to 8 possible bands is connected to the desire to limit interference: As an example, it is impossible to use frequency A in Italy because there would be too much interference from English terminals "further south" on cell C4 covering Italy, and from Italian terminals "further north" on cell C2 covering Great Britain (the interference is not necessarily symmetrical).

Figure 5:
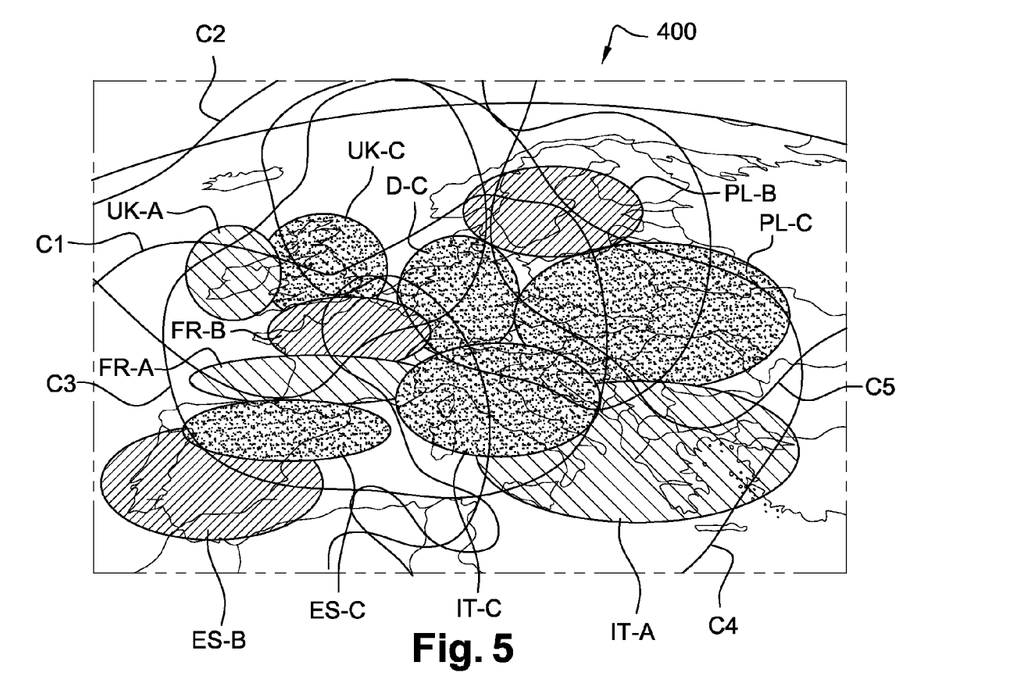
FIG. 5 represents the coverage area of FIG. 3 with a second frequency plan.

The network according to the invention allows some of these restrictions to be dispelled. FIG. 5 represents the coverage area of FIG. 3 with a second frequency plan 400 that constitutes a frequency plan that may be implemented at a certain time by utilizing the network according to the invention. Again, each 5 MHz frequency band is associated with a blue, yellow or red color in a frequency reuse scheme.

- the color blue is represented by close-together hatched lines and corresponds to frequency band B;
- the color red is represented by spaced-apart hatched lines and corresponds to frequency band A;
- the color yellow is represented by dots and corresponds to frequency band C.

According to the invention, by considering the case of a uniform distribution of terminals on the territory and by utilizing data from the satellite, typically antenna data, optimization means 108 may establish a more optimal frequency use plan: According to FIG. 5, the same frequency band A is utilized on cells C4 and C2 respectively covering Italy and Great Britain inasmuch as this band A will only be utilized by the ground terminals at the locations where less interference is generated. Typically in the case of plan 400, 11 bands are utilized from among the 12 possible bands with a total bit rate of 92 Mbps (or an increase of 80% with relation to the possible rate in the case of frequency plan 300 of FIG. 4). Table 3 indicates the frequencies associated with different countries in the coverage area.

and by utilizing heuristics to maximize the expected performance of the system (for example, reusing the same frequency range in areas that are sufficiently far apart).

As an example, European coverage W2A was partitioned into 11 areas; for each area, the spot beam covering it with the maximum G/T antenna gain to noise temperature value was chosen to serve this area; then, a frequency range and polarization were assigned to each area, so as to respect satellite constraints and space apart areas with the same pair (frequency, polarization) as much as possible.

As mentioned above, by dynamically exploiting the network according to the invention, the frequency plan (i.e., the mapping, including the transmission parameters to be utilized by the ground terminals) will be regenerated by optimization means 108 and continuously transmitted by satellite, thus offering even more responsiveness and capacity savings. The mapping globally broadcast to all terminals will be stored by each terminal that will use it if necessary upon each new transmission. Therefore, while the system is operational, the configuration may be dynamically optimized in the following manner:

1. the position of all terminals is collected and stored (by being based on the localization information sent during the last transmission);
2. the number of terminals present in each area as well as their behavior model (probability that they will transmit a message in the following period) will be calculated;
3. by using the known characteristics of the satellite, and by using a statistical model for the terminal behavior, the signal level potentially received by the terminals in the served areas, as well as the level of interference potentially received by the terminals in the unserved areas are calculated for each spot beam;

TABLE 3

| Spain (SP) | Great Britain (UK) | France (FR) | Italy (IT) | Poland (PL) | Germany (G) |
|---|---|---|---|---|---|
| B and C (referenced by SP-B and SP-C) | A and C (referenced by UK-A and UK-C) | A and B (referenced by FR-A and FR-B) | A and C (referenced by IT-A and IT-C) | B and C (referenced by PL-B and PL-C | C (referenced by D-C) |

An example of embodiment of optimization means 108 is based on the incremental optimization of a starting configuration.

A starting configuration for the system is initially set according to the following steps:

1. the overall coverage area is partitioned into several coverage areas (that do not overlap), normally smaller than the size of the spot beams utilized by the satellite;
2. for each area identified, a spot beam is chosen that must receive signals transmitted by the terminals found therein;
3. For each area, a set of parameters is fixed by being based on the known characteristics of the satellite (antenna radiation diagrams, power, transponder frequency, etc.)

4. The size of the areas that cause the most interference (or that contain the highest number of terminals) is reduced and, consequently, the size of the areas that cause the least interference (or that contain the lowest number of terminals) is enlarged.

Of course, it is entirely possible to use other algorithms for optimization means 108. These algorithms may, for example, utilize an exhaustive search of all possible configurations, a limited search by branch and bound techniques or searches based on the simplex algorithm.

It is important to note that, in the case of the W2A satellite, a communication network operating with several million ground terminals per cell and messages of 100 bytes each per frequency channel is planned. Because of this, such an operation will lead to the issuance of more than one billion messages per day in the European coverage area. Therefore, the network according to the invention allows such a quantity of messages to be absorbed by combining the transmission of transmission parameter mapping (dynamically updated) to terminals with a location at the level of each of the terminals.

Of course, the invention is not limited to the embodiment that has just been described.

Therefore, the invention was more particularly described in the case of the S band but it may also be applied to other types of frequency bands, for example, the Ka band.

In addition, even if the invention was more specifically described for a network utilizing a GPS positioning system, the invention is also applicable to other positioning means such as positioning means utilizing WIFI access points or based on a GSM type base station.

In addition, we described the invention in the case of a global transmission of a single mapping to all ground terminals ("broadcast" type transmission). It is also possible to apply the invention to a "multicast" type transmission: In this case, a first mapping is sent globally to a first group of ground terminals (for example, general public ground terminals) and a second mapping different from the first is sent to a second group of ground terminals (for example, professional ground terminals).

Even in the case of "broadcast" type transmission, data sent with the mapping may limit the utilization of this mapping to certain groups of terminals, or to certain services. Typically, certain transmission parameters may be reserved for the transmission of urgent messages, while other transmission parameters are utilized for transmitting non-urgent parameters.

The invention claimed is:

1. A telecommunication network for establishing radiofrequency links between at least one main ground station connected to an operating center of said network and ground terminals via a multiple spot beam telecommunication satellite, said network comprising:
   a multispot satellite;
   at least one main ground station;
   a plurality of ground terminals,
   said ground terminals being located in a plurality of cells that form a coverage area, each cell being associated with at least one spot beam with said satellite to which a frequency band is allocated;
   an operating center of said network connected to said main ground station, said operating center comprising:
      a determination module that, when in use, determines, at all times, transmission parameters characteristic of a position of said ground terminals in said coverage area, said transmission parameters covering the coverage area wherein the determination module determines a mapping of said coverage area with said transmission parameters using a combinatorial algorithm, and the combinatorial algorithm determines the transmission parameters using position information of the terminals, the number of terminals present in the area and a statistical model for the terminal behavior so that a size of areas that cause the most interference is reduced and a size of the areas that cause the least interference is enlarged;
      a transmitter that, when in use, transmits to each of said ground terminals all transmission parameters determined by said determination module,
   each of said ground terminals comprising:
      a positioning device that, when in use, determines a geographic position of said ground terminal in said coverage area,
      a storage device that, when in use, stores at least part of said set of transmission parameters,
      a processor that, when in use, determines the transmission parameters to be used by said ground terminal from said stored part of said set of transmission parameters and from said geographic position.

2. The network according to claim 1, wherein said positioning device configured to determine the geographic position in said coverage area of the ground terminals from among said plurality of ground terminals comprises:
   a device including a satellite positioning system;
   a positioning device using wireless access points;
   a positioning device based on one or more cellular type base stations;
   an absolute positioning device such as measuring the ground magnetic field or the wattage of known radio stations; or
   a relative positioning device such as an inertial positioning system.

3. The network according to claim 1, wherein said positioning device is configured to determine the position of said ground terminal with an accuracy of less than one order of magnitude to the size of the cell in which the ground terminal is located.

4. The network according to claim 1, wherein said determination module is configured to periodically determine said transmission parameters.

5. The network according to claim 4, wherein the updating period is between 1 and 1440 minutes.

6. The network according to claim 4, wherein periodic updating is carried out using data obtained in real time on the position of the ground terminals in said coverage area.

7. The network according to claim 1, wherein at least one cell is associated with at least two link spot beams with said satellite, a frequency band being allocated to each of said two spot beams, such that said determination module determines the frequency band to use within said cell so as to reduce cross interference between the cells forming the coverage area.

8. The network according to claim 1, wherein said determination module is configured to determine, at every update, for every coverage area, the frequency channel to be used by the terminals according to their position in said coverage area, each frequency band being broken down into frequency channels.

9. The network according to claim 8, wherein said determination module is configured to determine, at every update, the type of modulation to be used by the terminals according to their position in said coverage area.

10. The network according to claim 1, comprising a plurality of main ground stations, each main ground station being connected to said operating center of said network.

11. The network according to claim 1, wherein said determination module is configured to determine a group of transmission parameters for each of the geographic positions.

12. The network according to claim 11, wherein said processor configured to determine the transmission parameters to be utilized by said ground terminal is configured to select the transmission parameters to be utilized according to a probability distribution, in the group of parameters for said terminal.

13. The network according to claim 11, wherein said processor configured to determine the transmission parameters to be utilized by said ground terminal is configured to select the transmission parameters to be utilized according to the particular limitations of said ground terminal, in the group of parameters for said terminal.

14. The network according to claim 11, wherein said group is determined from said geographic position of said ground terminal by said processor.

15. The network according to claim 1, wherein said transmission parameters are determined by said determination module by considering factors including
an intermodulation between different frequency bands on board the satellite; or
a measured sensitivity of a satellite antenna for each coverage, or both.

16. The network according to claim 1, wherein said storage device of said ground terminal is configured to store all of the transmission parameters.

17. An operating center of a network according to claim 1, said operating center comprising:
a determination module configured to determine, at all times, transmission parameters characteristic of the position of said ground terminals in said coverage area, said transmission parameters covering the entire coverage area,
a transmitter configured to transmit to each of said ground terminals all transmission parameters determined by said determination module.

18. A ground terminal for implementing a network according to claim 1, said terminal comprising:
a positioning device configured to determine a geographic position of said ground terminal in said coverage area,
a storage device configured to store at least part of said set of transmission parameters,
a processor configured to determine the transmission parameters to be used by said ground terminal from said stored part of said set of transmission parameters and from said geographic position.

19. The network according to claim 1, wherein the transmission parameters are selected from a groups consisting of frequency band, frequency channel, polarization, time slot, modulation, code, type of modulation or code to be used by the terminals, polarization, level, code, forward error correction, and any combination thereof.

20. The network according to claim 1, wherein the determination module, when in use, determines a mapping of said coverage area with said transmission parameters.

21. The network according to claim 20, wherein determination of the mapping is based on real-time data collected from said at least one main ground station.

22. The network according to claim 21, wherein the real-time data include current positions of ground terminals.

23. The network according to claim 20, wherein the determination module, when in use, updates the mapping.

24. The network according to claim 20, wherein the determined mapping is simultaneously transmitted by the transmitter to all terminals in said coverage area.

25. The network according to claim 20, wherein the determination module uses a combinatorial algorithm to determine the mapping.

26. A telecommunication network for establishing radiofrequency links between at least one main ground station connected to an operating center of said network and ground terminals via a multiple spot beam telecommunication satellite, said network comprising:
a multispot satellite;
at least one main ground station;
a plurality of ground terminals,
said ground terminals being located in a plurality of cells that form a coverage area, each cell being associated with at least one spot beam with said satellite to which a frequency band is allocated;
an operating center of said network connected to said main ground station, said operating center comprising:
a determination module that, when in use, determines, at all times, transmission parameters characteristic of a position of said ground terminals in said coverage area, said transmission parameters covering the coverage area wherein the determination module determines a mapping of said coverage area with said transmission parameters using a combinatorial algorithm, and the combinatorial algorithm determines the transmission parameters using position information of the terminals, the number of terminals present in the area and a statistical model for the terminal behavior so that a size of areas that cause the most interference is reduced and a size of the areas that cause the least interference is enlarged,
a transmitter that, when in use, transmits to each of said ground terminals all transmission parameters determined by said determination module,
each of said ground terminals comprising:
a positioning device that, when in use, determines a geographic position of said ground terminal in said coverage area,
a storage device that, when in use, stores at least part of said set of transmission parameters, and
a processor that, when in use, determines the transmission parameters to be used by said ground terminal from said stored part of said set of transmission parameters and from said geographic position.

* * * * *